Figure 1:
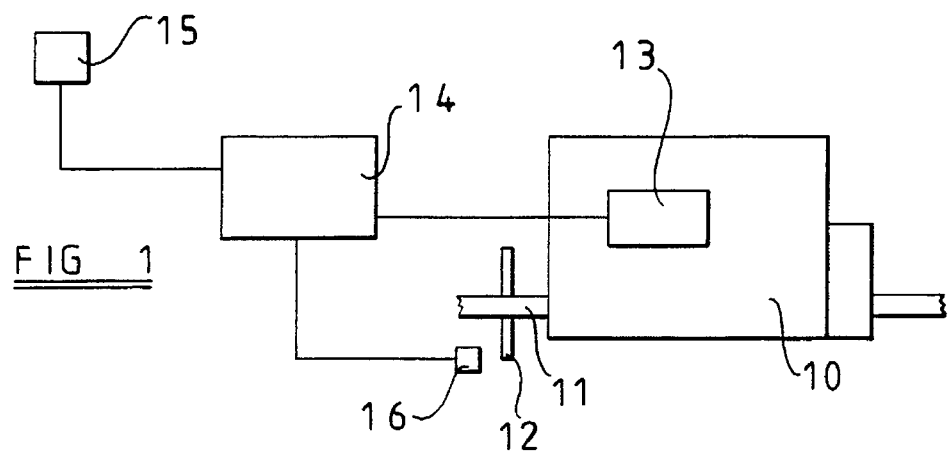

United States Patent
Wrobel

[11] Patent Number: 5,622,154
[45] Date of Patent: Apr. 22, 1997

[54] FUEL SYSTEM

[75] Inventor: Jeremy S. Wrobel, Middlesex, England

[73] Assignee: Lucas Industries Public Company Limited, West Midlands, England

[21] Appl. No.: 579,004

[22] Filed: Dec. 27, 1995

[30] Foreign Application Priority Data

Dec. 30, 1994 [GB] United Kingdom ............... 9426394

[51] Int. Cl.$^6$ ................... F02M 51/00; G01L 23/14
[52] U.S. Cl. ........................... 123/476; 73/117.3
[58] Field of Search ................ 123/414, 476, 123/612, 617; 73/116, 117.3, 119 R; 324/173

[56] References Cited

U.S. PATENT DOCUMENTS

| | | | |
|---|---|---|---|
| 4,005,993 | 11/1977 | Rackliffe et al. ............ | 73/116 |
| 4,055,998 | 11/1977 | Pettingell et al. ............ | 73/119 R |
| 4,787,354 | 11/1988 | Wilens et al. ............ | 123/414 |
| 4,928,649 | 5/1990 | Abe ............ | 123/414 |
| 4,959,996 | 10/1990 | Akasu ............ | 123/414 |
| 5,325,833 | 7/1994 | Fukui et al. ............ | 123/414 |
| 5,429,093 | 7/1995 | Fukui et al. ............ | 123/414 |

Primary Examiner—Willis R. Wolfe
Attorney, Agent, or Firm—Cesari and McKenna

[57] ABSTRACT

A fuel system for an internal combustion engine includes a controller which controls the operation of an engine fuel pump. Signals are supplied to the controller by a transducer which is responsive to the passage of teeth formed on the periphery of a wheel which is mounted on the engine crankshaft. In order to generate an engine speed signal it is necessary to know the tooth spacing errors and these are determined from the transducer signals by using a cross-correlation technique to correct the transducer signals for interval variation due to cyclic fluctuation of engine speed following which the tooth spacing errors are calculated to be used in subsequent calculations of the engine speed.

6 Claims, 3 Drawing Sheets

FUEL SYSTEM

This invention relates to a fuel system for an internal combustion engine, the system comprising a fuel pump, a controller for controlling the operation of the fuel pump so that fuel is delivered to the engine at the required time and in the desired quantity, means for supplying a demand signal to the controller, a wheel driven by the engine, a plurality of indicia on the wheel, and positioned about the axis of rotation thereof, transducer means responsive to the passage of said indicia as the wheel rotates, and means responsive to the signals generated by said transducer means for measuring the time intervals between the passage of the indicia past said transducer means.

In an example the indicia take the form of teeth which are formed in the periphery of the wheel and the transducer means is a variable reluctance probe. However, the indicia may have other forms such for example as a plurality of marks on the surface of the wheel and the transducer means in this case would comprise an optical sensor. The teeth or other indicia are equi-angularly spaced about the axis of rotation of the wheel however, due to manufacturing difficulties the spacings may not be exactly equal and this means that for a given speed of rotation of the wheel, the time intervals between the passage of the teeth past the transducer means will not be equal and therefore the speed signal which is computed each time a tooth passes the transducer means will not be constant even though the rotational speed is constant.

In practice although the nominal speed of an engine may be constant the actual speed of the engine fluctuates as each engine cylinder partakes of its power stroke in a cyclic manner and this represents an additional problem when determining the engine speed.

The object of the invention is to provide such a system in a simple and convenient form.

Figure 2:
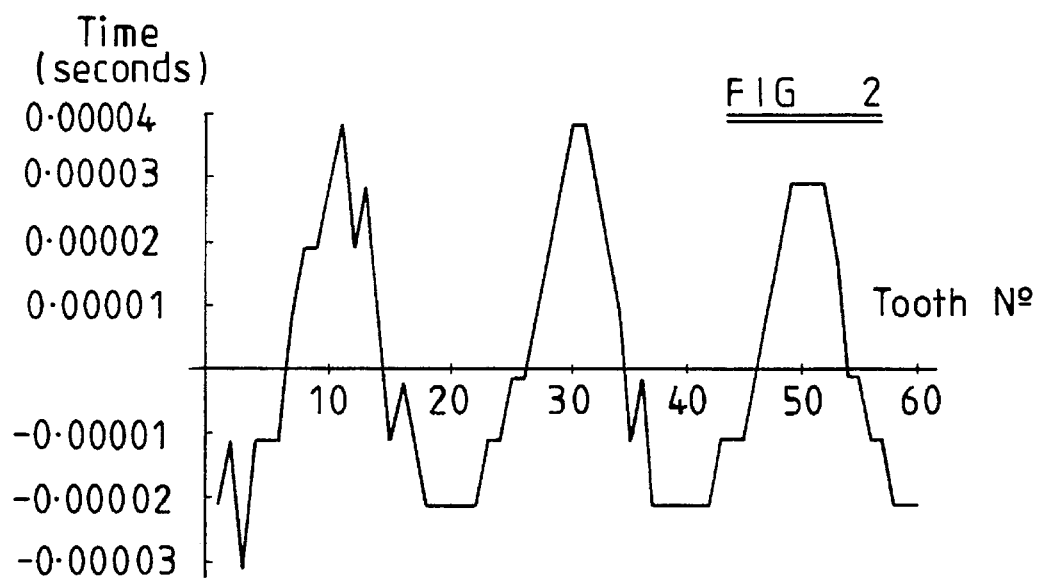
Figure 3:
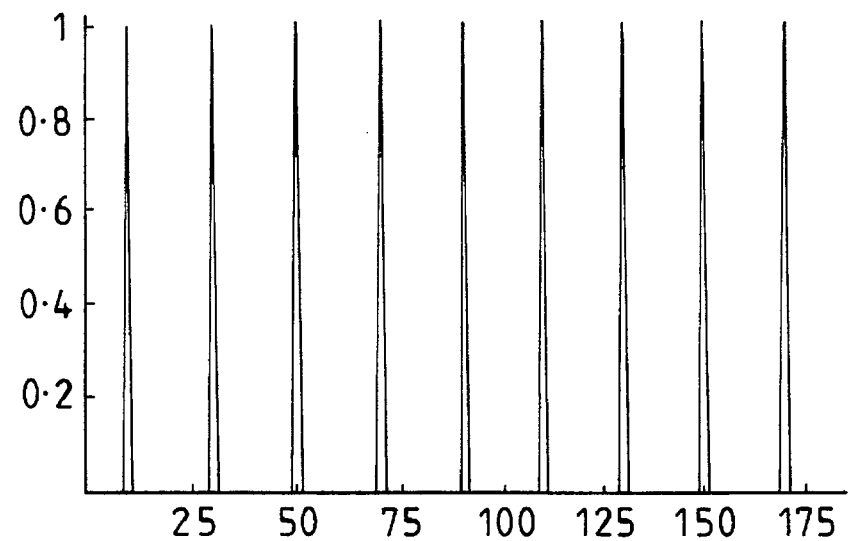
Figure 4:
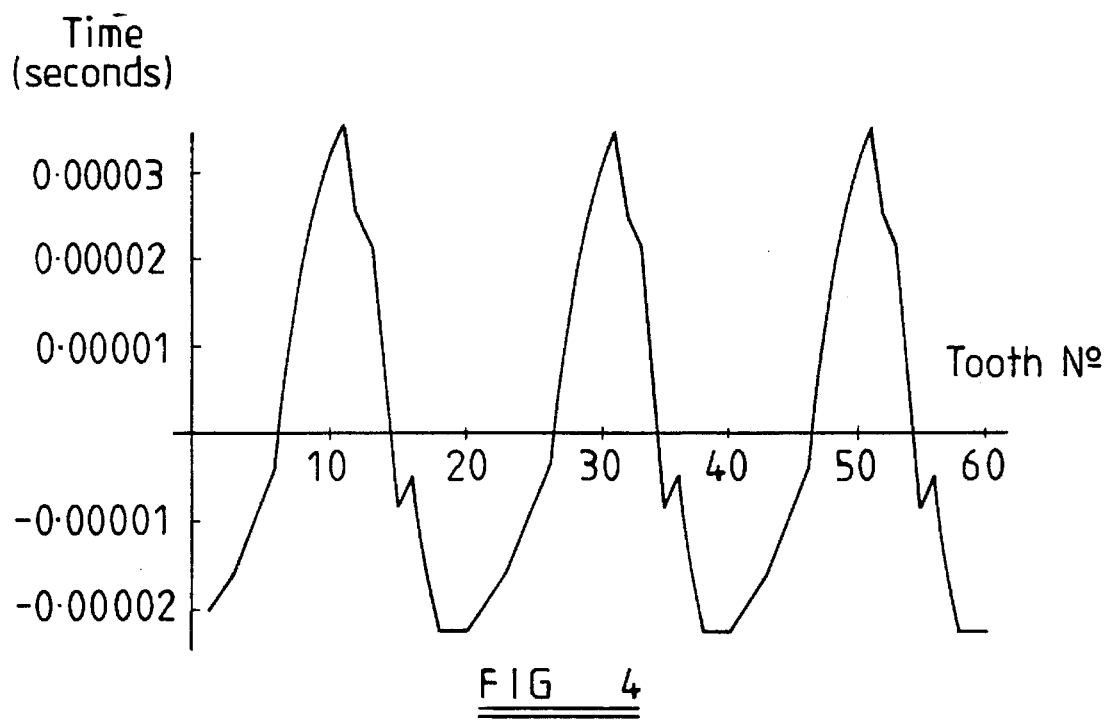
Figure 5:
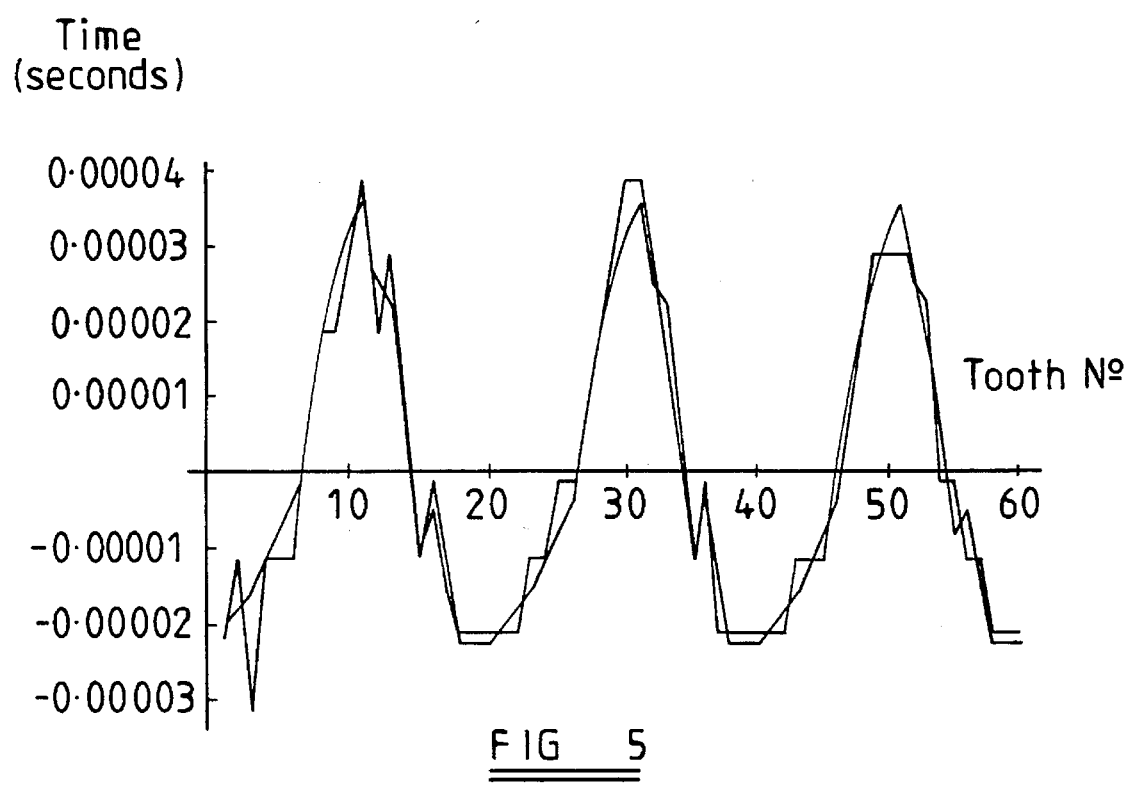
Figure 6:
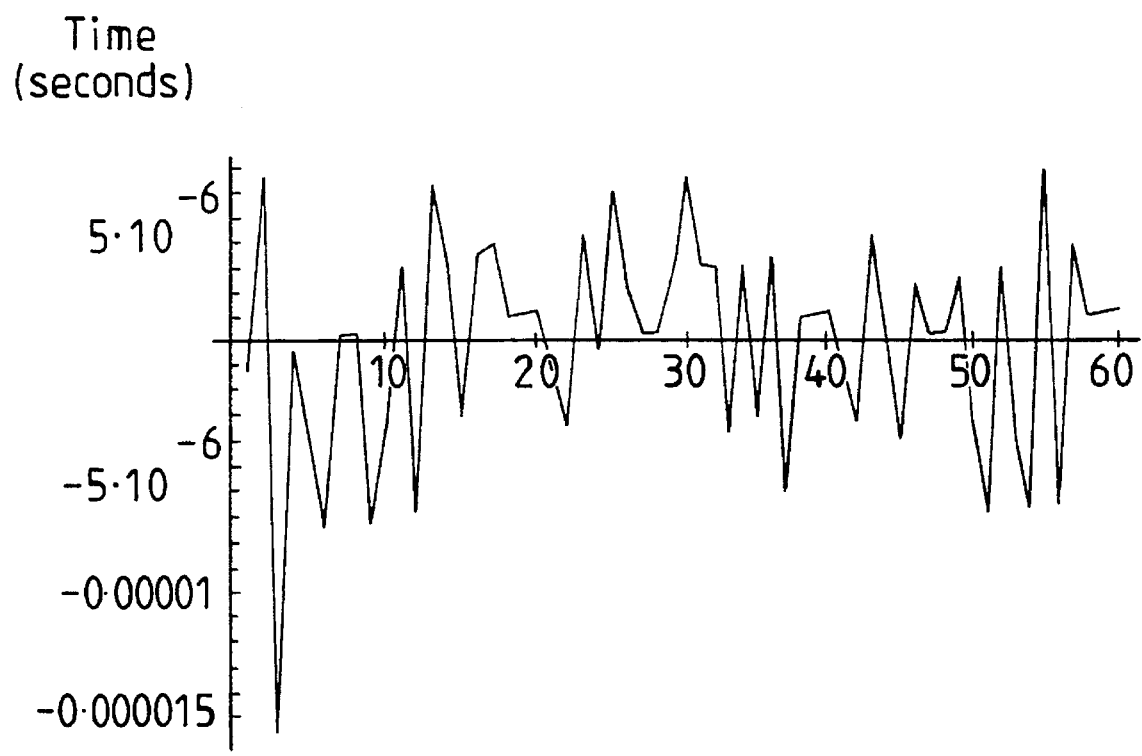

An example of a fuel system in accordance with the invention will now be described with reference to the accompanying drawings and diagrams in which:

FIG. 1 is a diagrammatic layout of the fuel system as applied to a compression ignition engine, FIG. 2 shows the variation in the time intervals about a mean value during one rotation of the wheel, FIG. 3 shows a sequence of unit impulses used in part of the computation, FIG. 4 shows the isolated periodic component, FIG. 5 shows the superimposition of the curves of FIG. 2 and FIG. 4, and FIG. 6 shows the result of subtracting the two curves shown in FIG. 4.

With reference to FIG. 1 there is indicated at 10 a vehicle compression ignition engine having a crankshaft 11 upon which is mounted a wheel or disc 12 the periphery of which in the example, is provided with 60 substantially equi-angularly spaced teeth.

Fuel is supplied to the engine by means of a fuel pump 13 which may for example, be a rotary distributor pump having an electrically operated control facility or the fuel pump can be replaced by a unit/injector system in which unit/injectors supply fuel to the combustion chambers of the engine respectively, each unit/injector incorporating an electrically controlled spill valve.

For controlling the operation of the pump 13 or the unit/injectors a controller 14 is provided and this supplies signals to determine the quantity of fuel supplied to the engine and the instant of fuel delivery. The controller 14 acts as a governor to control the engine speed and for this purpose it is supplied with a driver demand signal by a transducer 15 associated with the throttle pedal of the vehicle. In addition the controller is supplied with signals by a variable reluctance type transducer 16 which is responsive to the passage of the teeth on the wheel 12 as the engine crankshaft rotates. The controller utilizes the signals provided by the transducer 16 to determine the engine speed and may be supplied with other signals indicative of other engine operating parameters for example air pressure and engine temperature. On the basis of the signals supplied to it, the controller 14 determines the quantity of and the timing of fuel delivery to the engine.

In order that the controller 14 can respond quickly and correctly to changes in the operating parameters of the engine and in particular the engine speed, it is necessary to carry out a speed calculation each time a tooth passes the transducer. In the example the wheel has 60 teeth and this means that each tooth is 3° wide and is followed by a gap of the same dimension thereby providing a tooth cycle of 6°.

In practice because of errors in the manufacture of the wheel each tooth cycle may not have the same length and before the engine speed can be calculated it is necessary to know the error and the length of the tooth cycle.

The only information which is available to the controller are the time intervals between successive pulses produced by the transducer 16 but apart from the errors arising in the manufacture of the wheel the actual time intervals are also influenced by the engine speed which as previously mentioned varies in a cyclic manner even when the engine is operating at a nominal constant speed. In order therefore to determine the actual tooth spacing errors it is necessary to correct as far as is possible, for the cyclic engine speed variation. In a previous proposal the assumption was made that the engine speed fluctuations were sinusoidal in nature but in practice the fluctuations are not truly sinusoidal but are nevertheless periodic in nature.

FIG. 2 shows the actual time intervals measured about a mean between the pulses provided by the transducer 16 for one revolution of the crank shaft and the graph clearly demonstrates the periodic nature of the engine speed fluctuation. It is assumed that the nominal engine speed is constant that is to say that the engine is neither accelerating or decelerating. For any reciprocating piston engine the period is fixed and for a six cylinder four stroke engine the period is 120° which for a wheel having 60 teeth amounts to 20 teeth.

The periodic component of the waveform at the output of the transducer is isolated from the actual waveform using a cross-correlation technique which involves the shifting of a sequence of unit impulses which are shown in FIG. 3 and which have the same period, relative to the output from the transducer by successive values from 0–20. The unit sequence is stored in the microprocessor memory and accessed when required. At each shift the juxtaposed values of the shifted and unshifted sequences are multiplied together and then summed over the sequence spaces on the tooth number axis that remain to the right after the shift. Each summed value is then divided by the number of the same sequence spaces. The resulting sequence of twenty numbers when multiplied by the period in the example, 20, is the periodic component of the original waveform obtained at the output of the transducer. This is shown in FIG. 4.

FIG. 5 shows the periodic component of the signal superimposed on the original signal and if the two signals are subtracted the result is the variation in time due to tooth spacing errors only. FIG. 6 shows the result of the subtraction.

The actual tooth spacing errors in terms of degrees for a 60 tooth wheel, can now be determined by computation.

$$Tc[2].ER[1]-Tc[1].ER[2]=6 \ (Tc[1]-Tc[2])$$

$$Tc[3].ER[2]-Tc[2].ER[3]=6 \ (Tc[2]-Tc[3]) \ \text{etc.}$$

where Tc[1] is the time taken determined by cross-correlation, for the first tooth cycle consisting of the mean of the original transducer signal plus the normalised signal associated with tooth spacing errors only, and Tc[2] is the time taken determined by cross-correlation, for the second tooth cycle etc. and ER[1] is the actual spacing error between teeth 1 and 2 ER[2] is the actual spacing error between teeth 2 and 3 etc. If the actual tooth spacing error is required in radians the number 6 in the above equations is replaced by II/30.

The total error about the wheel is zero and using matrix techniques it is possible to solve the equation for ER[1] and ER[2] etc. It will be appreciated that numeral 6 in the above equations together with the equivalent term for radian measure of the error, is for a tooth cycle of 6°

The computation of the tooth spacing error is in theory required only once following manufacture. It may however be convenient to carry out the computation whenever the engine is serviced or when a fault is diagnosed or even at particular intervals during the use of the engine.

An alternative way of determining the tooth spring error once the periodic component of the waveform at the output of the transducer has been removed by the cross-correlation technique is to solve the equations:

$$ER[1] = \frac{6 \ TER[1]}{T_{MEAN}} \ \text{in degrees.}$$

$$ER[2] = \frac{6 \ TER[2]}{T_{MEAN}} \ \text{etc}$$

where TFR[1] is the time value of the tooth spacing error after the cross-correlation step has been carried out and TMEAN is the mean of the original transducer signal.

As described the nominal engine speed has been assumed to be constant. In practice however the engine may be accelerating or decelerating when the determination of the tooth spacing errors is to be carried out. At the intended time of determination it is first of all necessary to ascertain whether the nominal engine speed is changing that is to say whether the engine is accelerating or decelerating.

For a periodic function the sum of all the sample values taken at regular sampling points, over one period of that function will be the same irrespective of which sampling point in the cycle the first sample value is taken. Applying this to the engine situation, the sampling points extend over one revolution of the wheel 12 and if the aforesaid sum value varies from that obtained when starting from another sampling point, this is indicative of engine acceleration or deceleration. To obtain the aforesaid sum value, the sampling points, at which the function values to be summed are obtained, extend over one period of cyclic variation (20 teeth in the case of a 6 cylinder engine with a 60 tooth wheel). Detection of the variation of the aforesaid sum value can lead to postponement of the determination of the tooth spacing errors or lead to the introduction of a preliminary step to the determination process described above.

This preliminary step comprises obtaining the moving period mean of the transducer time data by first summing the values of successive sampling points over 1 period (20 teeth) and then dividing by the number of teeth in the period. This process is repeated after shifting the succession of sampling points by one point. This is repeated for all the teeth of the wheel. The values of the moving period mean signal [PMS] are associated with a mid tooth of wherever the summation period is located. The mean value of this signal is then determined and is assumed to be the constant value which would have been obtained had there been no engine acceleration or deceleration. This mean value is then subtracted from the [PMS] to obtain the deviations from the mean and these deviations are then subtracted from the original transducer signal to compensate for engine acceleration or deceleration.

I claim:

1. A fuel system for an internal combustion engine comprising a fuel pump, a controller for controlling the operation of the fuel pump so that fuel is delivered to the engine at the required time and in the desired quantity, means for supplying a demand signal to the controller, a wheel driven by the engine, a plurality of indicia on the wheel and positioned about the axis of rotation thereof, transducer means responsive to the passage of said indicia as the wheel rotates, means responsive to the signals generated by said transducer means for measuring the time intervals between the passage of the indicia past the transducer means, characterised by means for determining indicia spacing errors from the signals provided by said transducer means, said determining means first using a cross-correlation technique to separate from said signals the periodic component of the fluctuation in engine speed caused by the power strokes of the engine cylinders to produce normalised signals, and then calculating from said normalised signals the actual indicia spacing errors, the actual indicia spacing errors being utilised with the measured time intervals to provide an engine speed signal to the controller.

2. A fuel system according to claim 1, in which the calculation of the actual indicia spacing errors involves solving the equations $$Tc[2].ER[1]-Tc[1].ER[2]=N(Tc[1]-Tc[2])$$

$$Tc[3].ER[2]-Tc[2].ER[3]=N(Tc[2]-Tc[3]) \ \text{etc}$$

where Tc[1] is the time taken determined by cross-correlation for the first indicia cycle consisting of the mean of the transducer signals plus the normalised signal associated with indicia spacing errors only and Tc[2] is the time determined by cross-correlation, for the second indicia cycle etc., where, ER[1] is the actual spacing error between indicia 1 and 2

ER[2] is the actual spacing error between indicia 2 and 3 etc

N is the width of the indicia cycle in degrees or radians.

3. A fuel system according to claim 1, in which the calculation of the actual indicia spacing error involves solving the equations $$ER[1] = \frac{N \ TER[1]}{T_{MEAN}}$$

$$ER[2] = \frac{N \ TER[2]}{T_{MEAN}} \ \text{etc.}$$

where TER[1] is the time value of the tooth spacing error after the cross-correlation step has been carried out, and TMEAN is the mean of the signals from the transducer N is the width of the indicia cycle in degrees or radians.

4. A fuel system according to claim 1, characterised by further means operable to detect if the engine is running at a nominal constant speed, said further means acting to sum the values obtained at regular sampling points over at least one period of the periodic component of the engine speed fluctuation, and to compare that sum with a similar sum obtained by starting at another sampling point to determine whether or not the nominal speed of the engine is constant.

5. A fuel system according to claim 4, wherein in the event that the nominal speed of the engine is not constant, the values of said transducer signals are first adjusted prior to the application of the cross-correlation technique to minimise the variation of the transducer signals due to nominal engine speed variation.

6. A fuel system according to claim 4, in which said sampling period extends over one revolution of the wheel.

* * * * *